(12) United States Patent
Sasaki (10) Patent No.: US 6,673,633 B2
(45) Date of Patent: Jan. 6, 2004

(54) METHOD OF FORMING PATTERNED THIN FILM AND METHOD OF MANUFACTURING THIN-FILM MAGNETIC HEAD

(75) Inventor: Yoshitaka Sasaki, Tokyo (JP)

(73) Assignee: TDK Corporation, Tokyo (JP)

(*) Notice: Subject to any disclaimer, the term of this patent is extended or adjusted under 35 U.S.C. 154(b) by 238 days.

(21) Appl. No.: 09/870,737

(22) Filed: Jun. 1, 2001

(65) Prior Publication Data

US 2001/0055879 A1 Dec. 27, 2001

(30) Foreign Application Priority Data

Jun. 6, 2000 (JP) .................................... 2000-168391

(51) Int. Cl.⁷ .............................................. H01L 21/00
(52) U.S. Cl. ...................... 438/3; 438/712; 438/720; 438/734; 360/319; 360/313; 360/317; 360/126
(58) Field of Search .......................... 438/3, 712, 720, 438/734; 360/313, 319, 317, 126

(56) References Cited

U.S. PATENT DOCUMENTS 4,550,353 A * 10/1985 Hirai et al. ................. 360/125
5,850,325 A * 12/1998 Miyauchi et al. ........... 360/319
6,560,068 B1 * 5/2003 Sasaki ........................ 360/126

FOREIGN PATENT DOCUMENTS

JP          6-44528 A       2/1994
JP         11-339223    * 12/1999     ............ G11B/5/31

* cited by examiner

Primary Examiner—Amir Zarabian
Assistant Examiner—Christy Novacek
(74) Attorney, Agent, or Firm—Oliff & Berridge, PLC (57) ABSTRACT

A thin-film magnetic head includes a top pole layer that defines a write track width. The top pole layer is formed as follows. A high saturation flux density material such as FeN or FeCo is sputtered to form a film to be patterned. A magnetic layer having a specific pattern is formed on this film to be patterned. Using the magnetic layer as a mask, the film is etched through reactive ion etching. The film is thereby patterned and a pole portion layer is formed. Next, cross-sectional surfaces of the pole portion layer obtained through the reactive ion etching are slightly etched to remove deposits.

16 Claims, 6 Drawing Sheets

METHOD OF FORMING PATTERNED THIN FILM AND METHOD OF MANUFACTURING THIN-FILM MAGNETIC HEAD

BACKGROUND OF THE INVENTION

1. Field of the Invention

The present invention relates to a method of forming a patterned thin film by etching a film to be patterned, and to a method of manufacturing a thin-film magnetic head, the method including the step of forming a magnetic layer by etching a film to be patterned.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a write (recording) head having an induction-type electromagnetic transducer for writing and a read (reproducing) head having a magnetoresistive (MR) element for reading.

It is required to increase the track density on a magnetic recording medium in order to increase recording density among the performance characteristics of a write head. To achieve this, it is required to implement a write head of a narrow track structure wherein the width of top and bottom poles sandwiching the write gap layer on a side of the medium facing surface (air bearing surface) is reduced down to microns or the order of submicron. Semiconductor process techniques are utilized to implement such a structure.

A write track width of 0.2 to 0.3 μm has been recently required to implement a composite thin-film magnetic head that has an areal recording density of 40 to 60 gigabits per square inch.

In many of prior-art thin-film magnetic heads the magnetic layer that defines the write track width is made of NiFe and formed through plating. The saturation flux density of NiFe is increased by increasing the proportion of Fe. A well-known type of NiFe having a high saturation flux density is made up of 45 weight % of Ni and 55 weight % of Fe and exhibits a saturation flux density of about 1.6 T. If such a type of NiFe that has a high saturation flux density is utilized, the magnetic layer having a high saturation flux density is formed.

However, if the write track width is reduced as described above, it is impossible to obtain a sufficient magnetic flux in the air bearing surface even though the magnetic layer that defines the write track width is made of a type of NiFe that exhibits a high saturation flux density. As a result, it is likely that writing characteristics, such as an overwrite property that is a parameter indicating one of characteristics when data is written over existing data, are made insufficient.

To solve this problem, it is possible that the magnetic layer that defines the write track width is made of a high saturation flux density material, such as FeN or FeCo, that has a saturation flux density of about 2.0 T, for example, that is greater than the saturation flux density of NiFe. To form a patterned thin film made of such a high saturation flux density material, a method of etching a film to be patterned that is formed through sputtering is generally used. The etching method is ion milling, for example.

Reference is now made to FIG. 10A to FIG. 14A and FIG. 10B to FIG. 14B to describe an example of a method of manufacturing a thin-film magnetic head, the method including the step of forming the magnetic layer that defines the write track width by etching a film to be patterned through ion milling as described above. FIG. 10A to FIG. 14A are cross sections each orthogonal to the air bearing surface of the thin-film magnetic head. FIG. 10B to FIG. 14B are cross sections of a pole portion of the head each parallel to the air bearing surface.

Figure 10A:
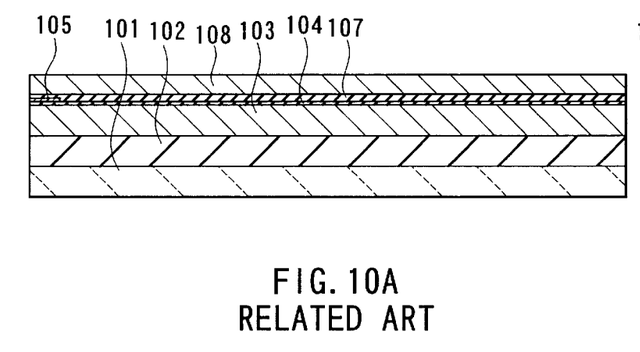
FIG. 10A and FIG. 10B are cross sections for illustrating a step in an example of method of manufacturing a thin-film magnetic head.
Figure 10B:
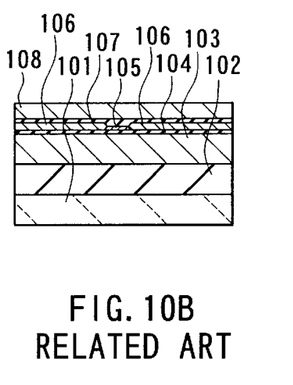

In the manufacturing method, as shown in FIG. 10A and FIG. 10B, an insulating layer 102 made of alumina ($Al_2O_3$), for example, is deposited on a substrate 101 made of aluminum oxide and titanium carbide ($Al_2O_3$—TiC), for example. On the insulating layer 102 a bottom shield layer 103 made of a magnetic material is formed for making a read head.

Next, on the bottom shield layer 103, alumina, for example, is deposited through sputtering to form a bottom shield gap film 104 as an insulating layer. On the bottom shield gap film 104 an MR element 105 for reading is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 3 μm is formed. The bottom pole layer 108 is made of a magnetic material and used for both a read head and a write head.

Figure 11A:
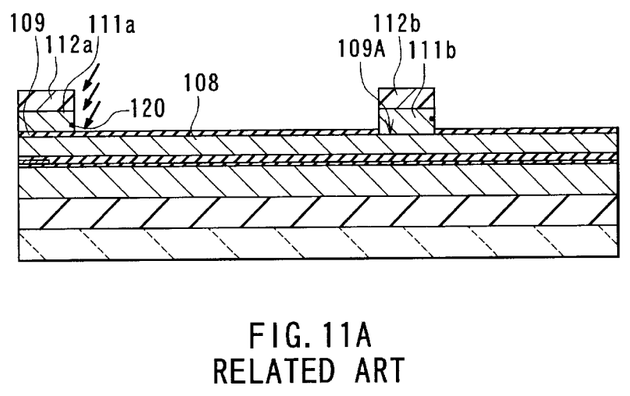
FIG. 11A and FIG. 11B are cross sections for illustrating a step that follows FIG. 10A and FIG. 10B.
Figure 11B:
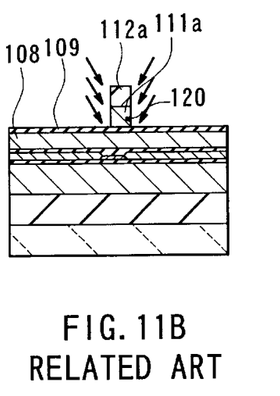

Next, as shown in FIG. 11A and FIG. 11B, on the bottom pole layer 108, a write gap layer 109 made of an insulating film such as an alumina film whose thickness is 0.15 μm is formed. Next, a portion of the write gap layer 109 is etched to form a contact hole 109A to make a magnetic path.

Next, a high saturation flux density material such as FeN or FeCo is sputtered over the entire surface to form a film to be patterned having a thickness of about 1.0 to 2.0 μm. On this film to be patterned photoresist masks 112a and 112b made of patterned photoresist layers and having a thickness of about 5 μm, for example, are formed. The photoresist mask 112a is formed on a portion of the film to be patterned that will be a pole portion. The photoresist mask 112b is formed on a portion of the film to be patterned located above the contact hole 109A.

Using the photoresist masks 112a and 112b as masks, the film to be patterned is etched through ion milling to form a pole portion layer 111a and a magnetic layer 111b. The pole portion layer 111a makes up the pole portion of the top pole layer. The magnetic layer 111b is connected to the bottom pole layer 108. The pole portion layer 111a has a width equal to the write track width.

Figure 12A:
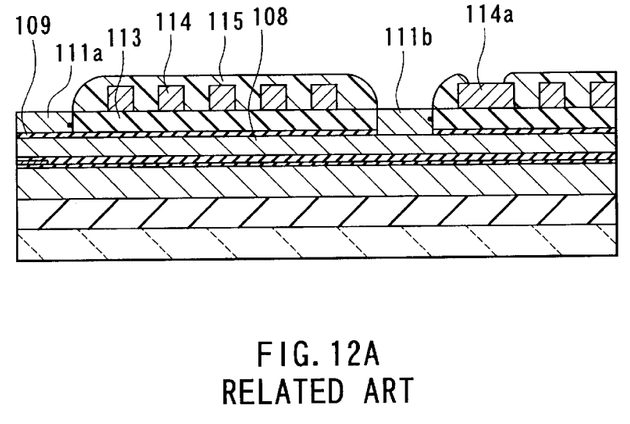
FIG. 12A and FIG. 12B are cross sections for illustrating a step that follows FIG. 11A and FIG. 11B.
Figure 12B:
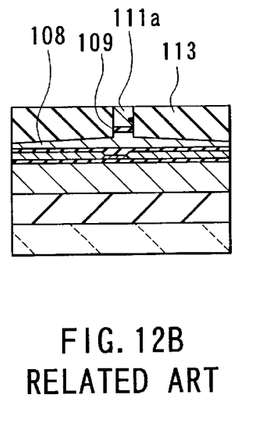

Next, as shown in FIG. 12A and FIG. 12B, the photoresist masks 112a and 112b are removed. Next, a portion of the write gap layer 109 around the pole portion layer 111a is etched, using the pole portion layer 111a as a mask. Furthermore, the bottom pole layer 108 is etched by 0.3 μm only, for example. As shown in FIG. 12B, the structure thereby obtained is called a trim structure wherein the sidewalls of the pole portion layer 111a, the write gap layer 109, and a part of the bottom pole layer 108 are formed vertically in a self-aligned manner.

Next, an insulating layer 113 made of an alumina film, for example, and having a thickness of 2 to 3 μm is formed on the entire surface. The insulating layer 113 is then polished to the surfaces of the pole portion layer 111a and the magnetic layer 111b and flattened.

Next, on the flattened insulating layer 113, a first layer 114 of a thin-film coil made of copper (Cu), for example, and having a thickness of 1 to 2 μm is formed for the induction-type write head. In FIG. 12A numeral 114a indicates a portion of the first layer 114 that will be connected to a second layer 116 of the coil described later. Next, a photoresist layer 115 having a specific shape is formed on the insulating layer 113 and the first layer 114. Heat treatment is performed at a specific temperature to flatten the surface of the photoresist layer 115.

Figure 13A:
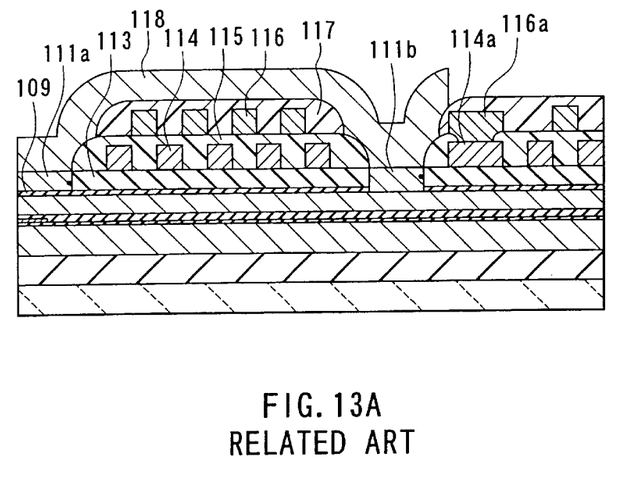
FIG. 13A and FIG. 13B are cross sections for illustrating a step that follows FIG. 12A and FIG. 12B.
Figure 13B:
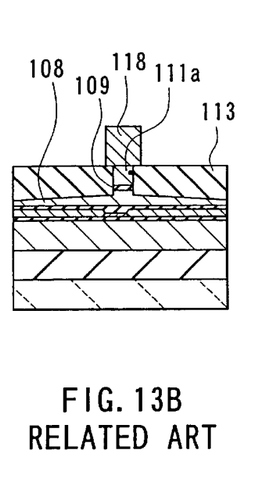

Next, as shown in FIG. 13A and FIG. 13B, on the photoresist layer 115, the second layer 116 of the thin-film coil having a thickness of 1 to 2 μm is formed. Next, a photoresist layer 117 having a specific shape is formed on the photoresist layer 115 and the second layer 116. Heat treatment is performed at a specific temperature to flatten the surface of the photoresist layer 117.

Next, a yoke portion layer 118 made of a magnetic material and having a thickness of about 2 to 3 μm is formed on the pole portion layer 111a, the photoresist layers 115 and 117, and the magnetic layer 111b. The yoke portion layer 118 makes up the yoke portion of the top pole layer.

Figure 14A:
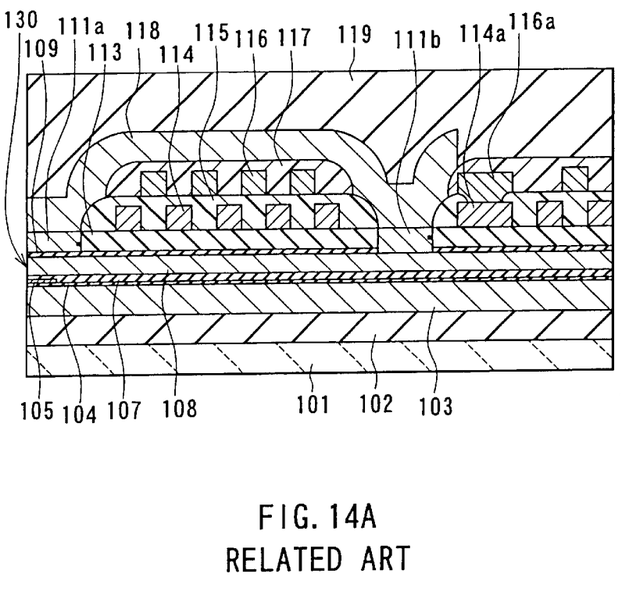
FIG. 14A and FIG. 14B are cross sections for illustrating a step that follows FIG. 13A and FIG. 13B.
Figure 14B:
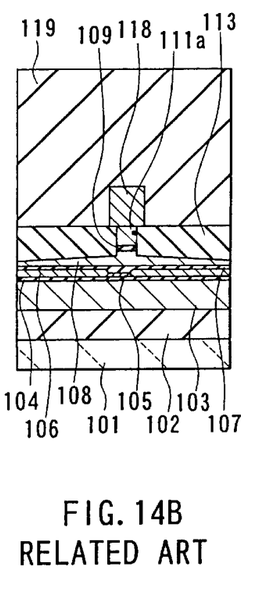

Next, as shown in FIG. 14A and FIG. 14B, an overcoat layer 119 made of alumina, for example, and having a thickness of 20 to 40μm is formed to cover the yoke portion layer 118. Finally, machine processing of the slider including the foregoing layers is performed to form the air bearing surface 130 of the thin-film magnetic head including the write head and the read head. The thin-film magnetic head is thus completed.

It is easy to achieve a small track width if the top pole layer that defines the write track width is made up of the pole portion layer 111a and the yoke portion layer 118, as shown in FIG. 14A and FIG. 14B, instead of forming the top pole layer made up of one layer. In addition, when the write track width is reduced, it is required that the pole portion layer 111a that defines the write track width is made of a high saturation flux density material such as FeN or FeCo, as described above. To form the pole portion layer 111a made of such a high saturation flux density material, the method generally used is to etch the film to be patterned that is formed through sputtering, as shown in FIG. 11A and FIG. 11B. The etching method is ion milling using the photoresist mask 112a as a mask.

However, the etching rate at which the film to be patterned made of a high saturation flux density material such as FeN or FeCo is etched through ion milling is very low, that is, about 30 to 40 nm per minute. Therefore, it takes a long time to form the pole portion layer 111a by etching the film to be patterned through ion milling. When etching is performed through ion milling, a poor pattern profile is obtained and the cross-sectional surface of the film patterned forms an angle of 50 to 70 degrees with respect to the bottom surface. It is therefore difficult to implement a small track width of 0.3 μm or smaller. In addition, when etching is performed through ion milling, the angle formed between the cross-sectional surface and the bottom surface of the patterned film obtained becomes smaller as the thickness of the film to be patterned increases. It is therefore more difficult to implement a small track width.

In Published Unexamined Japanese Patent Application Heisei 6-44528 (1994), a technique is disclosed for processing a magnetic substance layer by reactive ion etching in a chlorine-base gas. According to this technique, the magnetic substance layer is processed into minute dimensions in a shorter time, compared to the method of processing the magnetic substance layer by ion milling.

The pole portion layer 111a, formed by etching a film to be patterned made of a high saturation flux density material such as FeN or FeCo, easily reacts with water. Corrosion is therefore likely to occur in the pole portion layer 111a during the etching step as shown in FIG. 11A and FIG. 11B and the following steps. Numeral 120 indicates a corroded portion.

If the film to be patterned is etched through reactive ion etching to form the pole portion layer 111a, molecules of a component of a reactive gas deposit on the cross-sectional surface of the pole portion layer 111a and corrosion occurs in the pole portion layer 111a. For example, if the film to be patterned is etched through reactive ion etching in a chlorine-base gas to form the pole portion layer 111a, chlorine molecules deposit on the cross-sectional surface of the pole portion layer 111a. These chlorine molecules react with water to form hydrochloric acid that corrodes the pole portion layer 111a.

Therefore, the problem is that corrosion of the pole portion layer 111a frequently occurs if the film to be patterned made of a high saturation flux density material such as FeN or FeCo is etched through reactive ion etching, in particular. If corrosion of the pole portion layer 111a occurs, it is difficult to control the write track width, and writing characteristics such as the overwrite property and nonlinear transition shift (NLTS) are reduced.

OBJECTS AND SUMMARY OF THE INVENTION

It is a first object of the invention to provide a method of forming a patterned thin film for making the thin film having a fine pattern in a short time and for preventing corrosion of the patterned thin film.

It is a second object of the invention to provide a method of manufacturing a thin-film magnetic head for making a fine magnetic layer in a short time and for preventing corrosion of the magnetic layer.

A method of forming a patterned thin film of the invention comprises the steps of: forming a film to be patterned; forming a patterned thin film by etching a part of the film to be patterned, using reactive ion etching; and removing deposits on a cross-sectional surface of the patterned thin film that is obtained in the step of forming the patterned thin film.

According to the method of forming the patterned thin film of the invention, a part of the film to be patterned is etched through reactive ion etching to form the patterned thin film. Deposits on the cross-sectional surface of the patterned thin film are then removed.

According to the method of the invention, ion milling or reverse sputtering may be used in the step of removing the deposits.

According to the method of the invention, the film to be patterned may be etched, using a mask layer formed through plating as a mask, in the step of forming the patterned thin film. In this case, the mask layer may be made of a magnetic material capable of being formed through plating.

According to the method of the invention, the film to be patterned may be etched, using a mask layer made of an insulating material as a mask, in the step of forming the patterned thin film.

According to the method of the invention, the reactive ion etching may be performed through the use of a chlorine-base gas or a fluorine-base gas as a reactive gas in the step of forming the patterned thin film.

According to the method of the invention, the reactive ion etching may be performed at a temperature in a range of 50 to 300° C. in the step of forming the patterned thin film.

According to the method of the invention, the film to be patterned may be formed through sputtering.

According to the method of the invention, the film to be patterned may be made of a high saturation flux density material. The high saturation flux density material of the invention is a magnetic material whose saturation flux density is 1.6 T or greater.

According to the method of the invention, the patterned thin film may be a magnetic layer that is incorporated in a thin-film magnetic head.

A method of the invention is provided for manufacturing a thin-film magnetic head including: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; the second magnetic layer including a track width defining layer that defines a track width. The method comprises the steps of: forming the first magnetic layer; forming the gap layer on the pole portion of the first magnetic layer; forming the second magnetic layer on the gap layer; and forming the thin-film coil such that the at least part of the coil is placed between the first and second magnetic layers, the at least part of the coil being insulated from the first and second magnetic layers. The step of forming the second magnetic layer includes the steps of: forming a film to be patterned; forming the track width defining layer by etching a part of the film to be patterned, using reactive ion etching; and removing deposits on a cross-sectional surface of the track width defining layer that is obtained in the step of forming the track width defining layer.

According to the method of manufacturing the thin-film magnetic head of the invention, a part of the film to be patterned is etched through reactive ion etching to form the track width defining layer. Deposits on the cross-sectional surface of the track width defining layer are then removed.

According to the method of the invention, ion milling or reverse sputtering may be used in the step of removing the deposits.

According to the method of the invention, the film to be patterned may be etched, using a mask layer formed through plating as a mask, in the step of forming the track width defining layer. In this case, the mask layer may be made of a magnetic material capable of being formed through plating.

According to the method of the invention, the film to be patterned may be etched, using a mask layer made of an insulating material as a mask, in the step of forming the track width defining layer.

According to the method of the invention, the reactive ion etching may be performed through the use of a chlorine-base gas or a fluorine-base gas as a reactive gas in the step of forming the track width defining layer.

According to the method of the invention, the reactive ion etching may be performed at a temperature in a range of 50 to 300° C. in the step of forming the track width defining layer.

According to the method of the invention, the film to be patterned may be formed through sputtering.

According to the method of the invention, the film to be patterned may be made of a high saturation flux density material.

The method of manufacturing the thin-film magnetic head of the invention may further comprise the step of etching a part of the first magnetic layer around the track width defining layer, using reactive ion etching, after the track width defining layer is formed.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

[First Embodiment]

Reference is now made to FIG. 1A to FIG. 5A and FIG. 1B to FIG. 5B to describe a method of manufacturing a thin-film magnetic head, the method utilizing a method of forming a patterned thin film of a first embodiment of the invention. FIG. 1A to FIG. 5A are cross sections each orthogonal to the air bearing surface. FIG. 1B to FIG. 5B are cross sections of the pole portion each parallel to the air bearing surface.

Figure 1A:
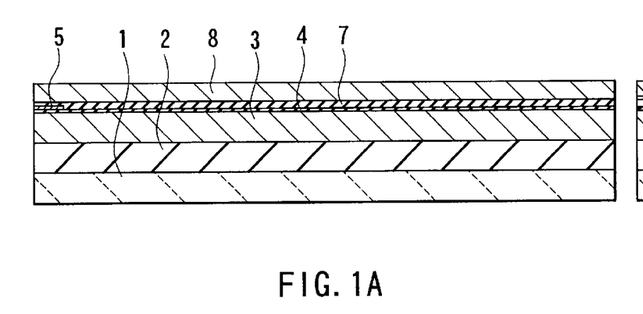
FIG. 1A and FIG. 1B are cross sections for illustrating a step in a method of manufacturing a thin-film magnetic head of a first embodiment of the invention.
Figure 1B:
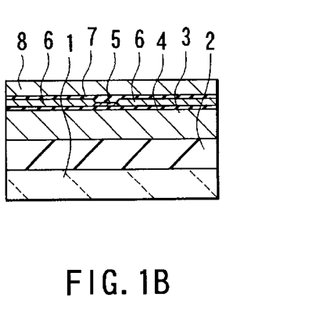

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a read head. The bottom shield layer 3 is formed through plating selectively on the insulating layer 2, using a photoresist film as a mask, for example. Next, although not shown, an insulating layer of alumina, for example, having a thickness of 4 to 5 $\mu$m, for example, is formed over the entire surface. This insulating layer is polished through chemical mechanical polishing (CMP), for example, so that the bottom shield layer 3 is exposed, and the surface is flattened.

Next, on the bottom shield layer 3, a bottom shield gap film 4 having a thickness of about 20 to 40 nm, for example, is formed as an insulating film. On the bottom shield gap film 4, an MR element 5 for reading having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulating material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina are fabricated through CVD, trimethyl aluminum (Al(CH$_3$)$_3$) and H$_2$O, for example, are used. Through the use of CVD, it is possible to make the thin and closely packed shield gap films 4 and 7 with few pinholes.

Next, on the top shield gap film 7, a top-shield-layer-cum-bottom-pole-layer (called a bottom pole layer in the following description) 8 is selectively formed. The bottom pole layer 8 has a thickness of about 2.5 to 3.5 $\mu$m, for example and is made of a magnetic material and used for both read head and write head. The bottom pole layer 8 may be made of NiFe (80 weight % Ni and 20 weight % Fe), or NiFe (45 weight % Ni and 55 weight % Fe) that is a high saturation flux density material, and may be formed into a specific shape through plating, or may be made of a material such as FeN or FeZrN that is a high saturation flux density material, and may be sputtered and then selectively etched to obtain a specific shape. Alternatively, a material such as CoFe or a Co-base amorphous material that is a high saturation flux density material may be used.

Figure 2A:
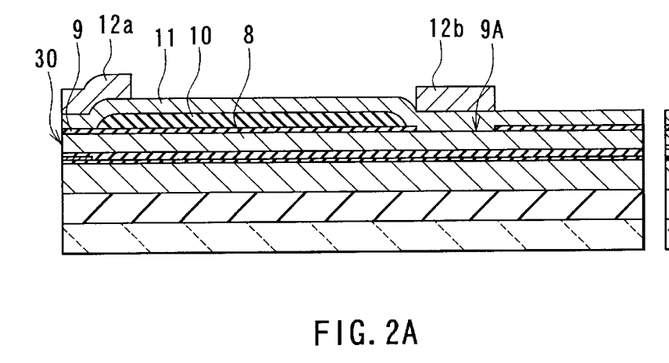
FIG. 2A and FIG. 2B are cross sections for illustrating a step that follows FIG. 1A and FIG. 1B.
Figure 2B:
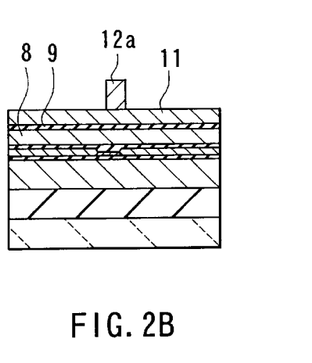

Next, as shown in FIG. 2A and FIG. 2B, a write gap layer 9 made of an insulating material and having a thickness of 0.1 to 0.15 $\mu$m, for example, is formed over the entire surface of the bottom pole layer 8. In general, the insulating material used for the gap layer 9 may be alumina, aluminum nitride, a silicon-dioxide-base material, a silicon-nitride-base material, or diamond-like carbon (DLC) and so on. The gap layer 9 may be fabricated through sputtering or CVD. If the gap layer 9 made of an alumina film is fabricated through CVD, trimethyl aluminum (Al(CH$_3$)$_3$) and H$_2$O, for example, are used. Through the use of CVD, it is possible to make the thin and closely packed gap layer 9 with few pinholes.

Next, a portion of the gap layer 9 located near the center of a thin-film coil 14 described later is etched to form a contact hole 9A for making the magnetic path.

Next, an insulating layer 10 of alumina, for example, having a thickness of 0.8 $\mu$m, for example, is formed on the gap layer 9 from a point near the contact hole 9A to a point at a specific distance from the air bearing surface 30. The insulating layer 10 defines the throat height.

Next, a high saturation flux density material such as FeN or FeCo is sputtered over the entire surface to form a film 11 to be patterned having a thickness of about 0.5 to 1.0 $\mu$m. Next, magnetic layers 12a and 12b each of which has a specific shape and has a thickness of 2.5 $\mu$m, for example, are formed through plating on the film 11. The magnetic layer 12a is formed on a portion of the film 11 to be a pole portion. The magnetic layer 12b is formed on a portion of the film 11 located in the contact hole 9A. The magnetic layers 12a and 12b will be used as masks when the film 11 is etched through reactive ion etching, as will be described later. The magnetic layers 12a and 12b thus correspond to mask layers of the invention.

It is acceptable that the magnetic layers 12a and 12b are made of a magnetic material capable of being formed through plating. For example, the magnetic layers 12a and 12b may be made of NiFe consisting of 80 weight % of Ni and 20 weight % of Fe, or NiFe consisting of 45 weight % or smaller of Ni and 55 weight % or greater of Fe that is a high saturation flux density material.

Figure 3A:
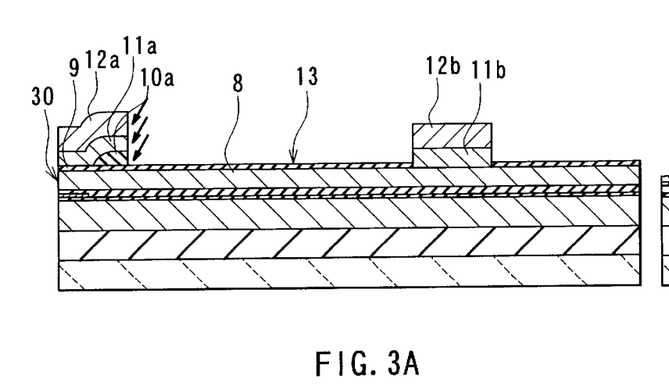
FIG. 3A and FIG. 3B are cross sections for illustrating a step that follows FIG. 2A and FIG. 2B.
Figure 3B:
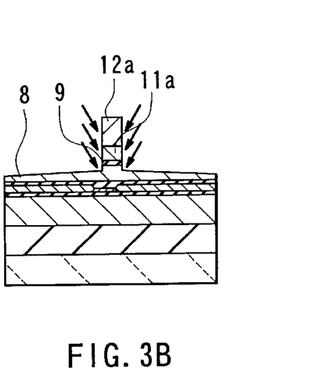

Next, as shown in FIG. 3A and FIG. 3B, the film 11 to be patterned and the insulating layer 10 are etched through reactive ion etching (RIE), using the magnetic layers 12a and 12b as masks. The film 11 is thereby patterned so that a pole portion layer 11a and a magnetic layer 11b are formed. The pole portion layer 11a includes a part of the pole portion of the top pole layer. The magnetic layer 11b is connected to the bottom pole layer 8. In addition, the insulating layer 10 is patterned so that a throat height defining layer 10a that defines the throat height is formed. Through this etching, a coil encasing portion 13 is formed in a region in which the thin-film coil 14 described later will be formed. The bottom of the coil encasing portion 13 is the top surface of the write gap layer 9.

Next, portions of the gap layer 9 and the bottom pole layer 8 around the pole portion layer 11a are etched through RIE, using the magnetic layer 12a as a mask. A trim structure as shown in FIG. 3B is thus formed. The trim structure suppresses an increase in the effective track width due to expansion of a magnetic flux generated during writing in a narrow track.

The pole portion layer 11a has a width equal to the write track width. Therefore, the pole portion layer 11a corresponds to the track width defining layer of the invention. In this embodiment the magnetic layer 12a includes another part of the pole portion of the top pole layer and has a width equal to the write track width.

The reactive gas used for the RIE is a chlorine-base gas such as Cl$_2$ or BCl$_3$, or a fluorine-base gas such as CF$_4$ or SF$_6$, for example. It is preferred to use Cl$_2$ or BCl$_3$, in particular. The RIE is preferably performed at a temperature in a range of 50 to 300° C. If the RIE is performed at such a high temperature, deposition of Ni molecules during the RIE is prevented when the magnetic layers 12a and 12b are made of NiFe.

Next, cross-sectional surfaces of the magnetic layer 12a, the pole portion layer 11a, the gap layer 9 and part of the bottom pole layer 8 that have been obtained through the RIE are slightly etched through ion milling using an argon-base gas, for example. The angle (with respect to the bottom surface of the layer patterned) at which ion beams are applied for the ion milling is 45 to 70 degrees, for example, and a period for which the etching is performed is 1 to 5 minutes, for example. This ion milling removes molecules of a component of the reactive gas, such as chlorine molecules, that have deposited on the above-mentioned cross-sectional surfaces therefrom. It is thereby possible to prevent corrosion of those cross-sectional surfaces.

If the cross-sectional surfaces of the layers that have been obtained through the RIE are slightly etched through ion milling, the width of the pole portion layer 11a that defines the write track width is made smaller than the width thereof obtained through the RIE. For example, if the RIE is performed so that the width of the pole portion layer 11a and the magnetic layer 12a is made 0.3 µm and ion milling is performed so that each side of the pole portion layer 11a and the magnetic layer 12a is etched by 0.05 µm, the width of the pole portion layer 11a and the magnetic layer 12a, that is, the write track width is made 0.2 µm.

Reverse sputtering (sputter etching) may be performed in place of the above-mentioned ion milling.

The method of forming the patterned thin film of the embodiment is the method of patterning the film 11 by etching through RIE and then slightly etching the cross sectional surfaces of the patterned film obtained as described above.

Figure 4A:
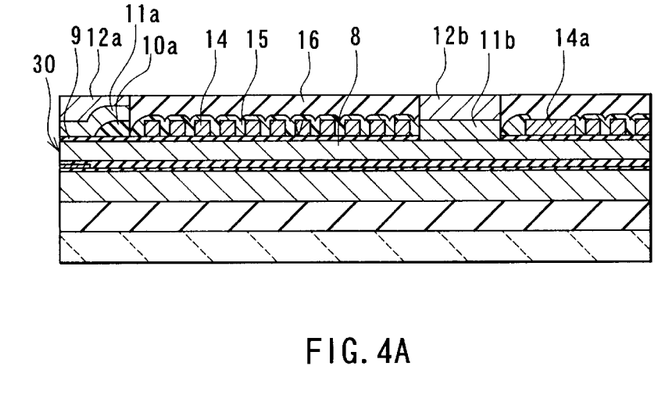
FIG. 4A and FIG. 4B are cross sections for illustrating a step that follows FIG. 3A and FIG. 3B.
Figure 4B:
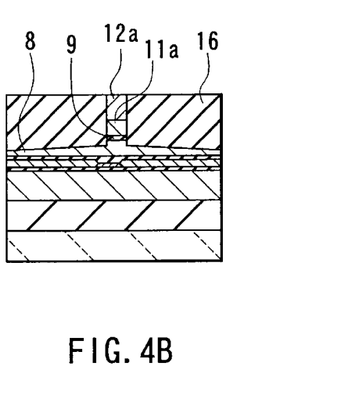

Next, as shown in FIG. 4A and FIG. 4B, the thin-film coil 14 made of copper (Cu), for example, is formed by frame plating, for example, in the coil encasing portion 13. For example, the thickness of the coil 14 is about 1.0 to 2.0 µm and the pitch is 1.2 to 2.0 µm. The coil 14 is wound around the magnetic layer 11b. In FIG. 4A numeral 14a indicates a portion for connecting the coil 14 to a lead layer 18 described later.

Next, a photoresist layer 15 is formed to cover the coil 14. An insulating layer 16 of alumina, for example, having a thickness of about 3 to 4 µm is formed over the entire surface. The insulating layer 16 is then polished through CMP, for example, so that the magnetic layers 12a and 12b are exposed, and the surface is flattened.

Figure 5A:
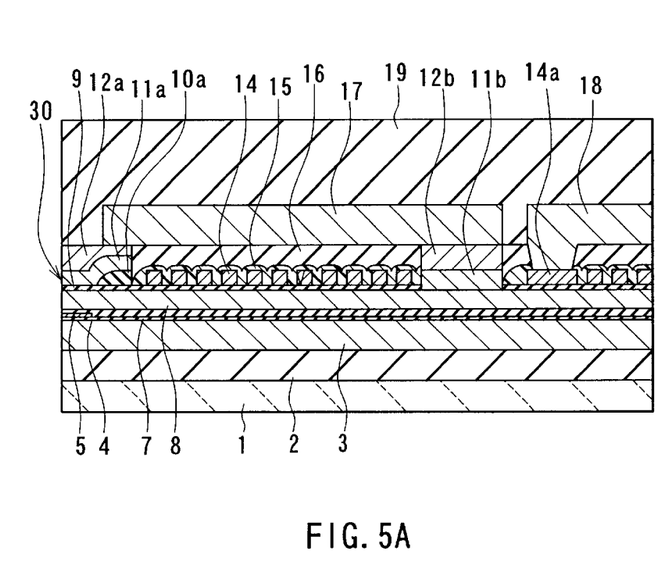
FIG. 5A and FIG. 5B are cross sections for illustrating a step that follows FIG. 4A and FIG. 4B.
Figure 5B:
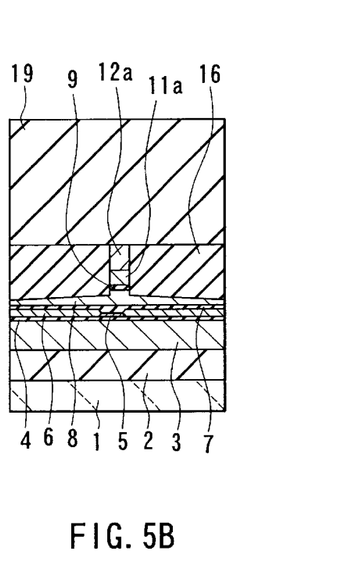

Next, as shown in FIG. 5A and FIG. 5B, a portion of the insulating layer 16 located on the connecting portion 14a is etched to form a contact hole. Next, a yoke portion layer 17 to be the yoke portion of the top pole layer is formed on the magnetic layer 12a, the insulating layer 16 and the magnetic layer 12b. The yoke portion layer 17 has a thickness of about 2 to 3 µm, for example. At the same time, the lead layer 18 to be connected to the portion 14a is formed. The lead layer 18 has a thickness of about 2 to 3 µm, for example. The yoke portion layer 17 may be made of NiFe (80 weight % Ni and 20 weight % Fe), or NiFe (45 weight % Ni and 55 weight % Fe) that is a high saturation flux density material, and may be formed through plating into a specific shape, or may be made of a material such as FeN or FeZrN that is a high saturation flux density material, and may be selectively etched to form a specific shape. Alternatively, a material such as CoFe or a Co-base amorphous material that is a high saturation flux density material may be used. To improve the high frequency characteristics, the yoke portion layer 17 may be made of layers of inorganic insulating films and magnetic layers of Permalloy, for example.

The yoke portion layer 17 has an end closer to the air bearing surface 30 that is located at a distance of only 0.5 to 1.0 µm, for example, from the air bearing surface 30. According to this embodiment, in particular, this end of the yoke portion layer 17 is located near the zero throat height level, that is, an end of the throat height defining layer 10a closer to the air bearing surface 30.

Next, an overcoat layer 19 of alumina, for example, having a thickness of 20 to 40 µm, for example, is formed over the entire surface. The surface of the overcoat layer 19 is flattened and pads (not shown) for electrodes are formed on the overcoat layer 19. Finally, lapping of the slider including the foregoing layers is performed to form the air bearing surface 30 of the thin-film magnetic head including the write head and the read head. The thin-film magnetic head of the embodiment is thus completed.

In this embodiment the bottom pole layer 8 corresponds to the first magnetic layer of the invention. The top pole layer made up of the pole portion layer 11a, the magnetic layers 11b, 12a and 12b, and the yoke portion layer 17 corresponds to the second magnetic layer of the invention. The bottom shield layer 3 corresponds to the first shield layer of the invention. Since the bottom pole layer 8 also functions as the top shield layer, the bottom pole layer 8 corresponds to the second shield layer of the invention, too.

As described so far, the thin-film magnetic head manufactured through the method of the embodiment comprises the medium facing surface that faces toward a recording medium (the air bearing surface 30), the read head and the write head (induction-type electromagnetic transducer). The read head has: the MR element 5; and the bottom shield layer 3 and the top shield layer (the bottom pole layer 8) for shielding the MR element 5. Portions of the bottom shield layer 3 and the top shield layer located on a side of the air bearing surface 30 are opposed to each other, the MR element 5 being placed between these portions.

The write head has the bottom pole layer 8 and the top pole layer (made up of the pole portion layer 11a, the magnetic layers 11b, 12a and 12b, and the yoke portion layer 17) that are magnetically coupled to each other, each of which includes at least one layer. The bottom pole layer 8 and the top pole layer include pole portions that are opposed to each other and placed in regions on a side of the medium facing surface. The write head further has: the write gap layer 9 placed between the pole portion of the bottom pole layer 8 and the pole portion of the top pole layer; and the thin-film coil 14 at least a part of which is placed between the bottom pole layer 8 and the top pole layer, the at least part of the coil 14 being insulated from the bottom pole layer 8 and the top pole layer.

According to the method of manufacturing the thin-film magnetic head of the embodiment, the film 11 to be patterned made of a high saturation flux density material such as FeN or FeCo is etched through RIE and patterned, and cross-sectional surfaces of the film thus patterned are slightly etched through ion milling. The pole portion layer 11a that defines the write track width is thus formed. The rate at which the film 11 is etched through the RIE is about 200 nm per minute which is higher than the rate at which etching through ion milling is performed. When the film 11 is etched through the RIE, it is possible that the cross-sectional surfaces of the film patterned form an angle of nearly 90 degrees with respect to the bottom surface.

According to the embodiment, the cross-sectional surfaces of the film patterned through the RIE are slightly etched through ion milling. It is thereby possible that deposits such as molecules of a component of the reactive gas like chlorine molecules that have deposited on the above-mentioned cross-sectional surfaces are removed therefrom.

According to the embodiment, the cross-sectional surfaces of the film patterned through the RIE are slightly etched through ion milling. As a result, it is further possible that the width of the pole portion layer 11a that defines the write track width is made smaller than the width thereof obtained through the RIE.

According to the embodiment as thus described, the pole portion layer 11a having fine dimensions is formed with accuracy in a short time, and corrosion of the pole portion layer 11a is prevented. It is therefore possible to implement the thin-film magnetic head having a small write track width. According to the embodiment, the film 11 is etched through the RIE at a high rate, and the cross-sectional surfaces of the film 11 patterned through the RIE form an angle of nearly 90 degrees with respect to the bottom surface. As a result, it is possible to increase the thickness of the pole portion layer 11a while the width thereof is reduced. Due to these features of the embodiment, it is possible to improve the writing characteristics of the thin-film magnetic head, such as the overwrite property and the NLTS.

According to the embodiment, the thin-film coil 14 is located on a side of the pole portion layer 11a. It is thereby possible that an end of the coil 14 closer to the air bearing surface 30 is located near an end of the pole portion layer 11a. In addition, the coil 14 is formed on the flat write gap layer 9, so that the coil 14 having minute dimensions is formed with accuracy. Due to these features of the embodiment, it is possible to reduce the magnetic path length.

If a yoke portion layer is connected to a pole portion having a width equal to the write track width and a length equal to the throat height, the cross-sectional area of the magnetic path abruptly decreases in the portion connecting the yoke portion layer to the pole portion. As a result, a magnetic flux may be saturated in this portion. This problem frequently occurs when the throat height is reduced, in particular.

According to the embodiment of the invention, in contrast, an end of the pole portion layer 11a and an end of the magnetic layer 12a located on the pole portion layer 11a, these ends being farther from the air bearing surface 30 (closer to the right side of FIG. 5A), are located farther from the air bearing surface 30 than the zero throat height level. As a result, relatively wide areas of the magnetic layer 12a and the yoke portion layer 17 are in contact and connected with each other. Therefore, according to the embodiment, it is impossible that the cross-sectional area of the magnetic path abruptly decreases in the portion connecting the yoke portion layer 17 to the pole portion layer 11a. As a result, saturation of a magnetic flux halfway through the magnetic path is prevented. According to the embodiment, it is thereby possible to utilize the magnetomotive force generated by the thin-film coil 14 for writing with efficiency. It is thus possible to provide the thin-film magnetic head having the write head that exhibits excellent high-frequency characteristics, NLTS and overwrite property.

In this embodiment the end face of the yoke portion layer 17 facing toward the air bearing surface 30 is located at a distance from the air bearing surface 30. As a result, the embodiment prevents 'side write', that is, writing of data in a region of a recording medium where data is not supposed to be written. In the embodiment an end of the pole portion layer 11a and an end of the magnetic layer 12a, these ends being farther from the air bearing surface 30, are located farther from the air bearing surface 30 than the zero throat height level. As a result, it is impossible that the cross-sectional area of the magnetic path abruptly decreases even though the end face of the yoke portion layer 17 facing toward the air bearing surface 30 is located at a distance from the air bearing surface 30 as described above.

According to the embodiment, the thin-film coil 14 placed in the coil encasing portion 13 is covered with the photoresist layer 15 on which the insulating layer 16 is further provided. The top surface of the insulating layer 16 and the top surfaces of the magnetic layers 12a and 12b are flattened. It is thereby possible to form the yoke portion layer 17 thereafter with accuracy.

[Second Embodiment]

Reference is now made to FIG. 6A to FIG. 9A and FIG. 6B to FIG. 9B to describe a method of manufacturing a thin-film magnetic head, the method utilizing a method of forming a patterned thin film of a second embodiment of the invention. FIG. 6A to FIG. 9A are cross sections each orthogonal to the air bearing surface. FIG. 6B to FIG. 9B are cross sections of the pole portion each parallel to the air bearing surface.

The method of manufacturing the thin-film magnetic head of the second embodiment includes the steps performed until the insulating layer 10 is formed that are similar to those of the first embodiment.

Figure 6A:
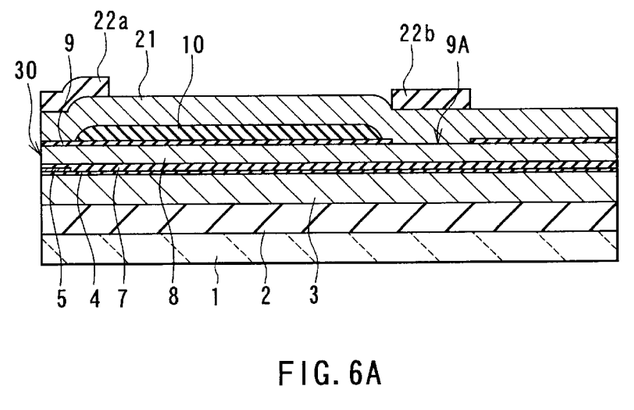
FIG. 6A and FIG. 6B are cross sections for illustrating a step in a method of manufacturing a thin-film magnetic head of a second embodiment of the invention.
Figure 6B:
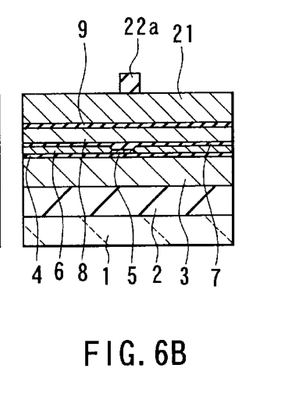

In the following step of the method of the second embodiment, as shown in FIG. 6A and FIG. 6B, a high saturation flux density material such as FeN or FeCo is sputtered over the entire surface to form a film 21 to be patterned having a thickness of about 1.0 to 2.0 $\mu$m. Next, mask layers 22a and 22b each of which is made of an insulating material such as alumina and has a specific shape and has a thickness of 1.0 $\mu$m, for example, are formed on the film 21. The mask layer 22a is formed on a portion of the film 21 to be a pole portion. The mask layer 22b is formed on a portion of the film 21 located in the contact hole 9A. To form the mask layers 22a and 22b, for example, a patterned metal layer is formed on an alumina layer, and the alumina layer is etched through reactive ion etching, using the metal layer as a mask.

Figure 7A:
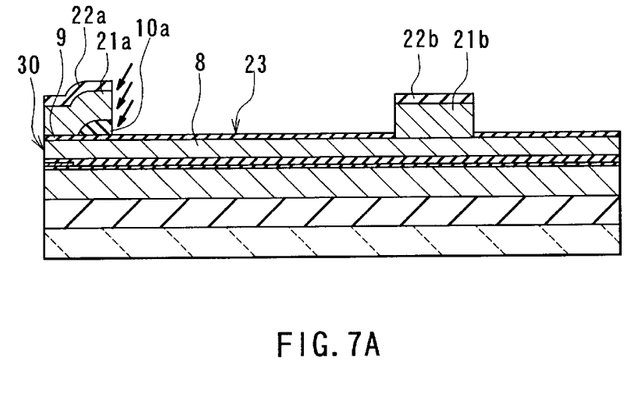
FIG. 7A and FIG. 7B are cross sections for illustrating a step that follows FIG. 6A and FIG. 6B.
Figure 7B:
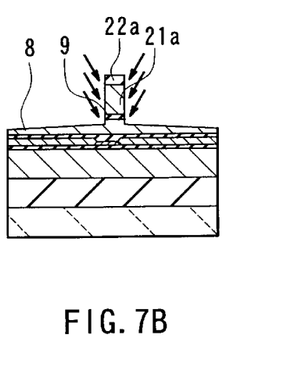

Next, as shown in FIG. 7A and FIG. 7B, the film 21 to be patterned and the insulating layer 10 are etched through RIE, using the mask layers 22a and 22b as masks. The film 21 is thereby patterned so that a pole portion layer 21a and a magnetic layer 21b are formed. The pole portion layer 21a includes the pole portion of the top pole layer. The magnetic layer 21b is connected to the bottom pole layer 8. In addition, the insulating layer 10 is patterned so that the throat height defining layer 10a that defines the throat height is formed. Through this etching, a coil encasing portion 23 is formed in a region in which a thin-film coil 24 described later will be formed. The bottom of the coil encasing portion 23 is the top surface of the write gap layer 9.

Next, portions of the gap layer 9 and the bottom pole layer 8 around the pole portion layer 21a are etched through RIE, using the mask layer 22a as a mask. A trim structure as shown in FIG. 7B is thus formed.

The pole portion layer 21a has a width equal to the write track width. Therefore, the pole portion layer 21a corresponds to the track width defining layer of the invention.

Next, cross-sectional surfaces of the mask layer 22a, the pole portion layer 21a, the gap layer 9 and part of the bottom pole layer 8 that have been obtained through the RIE are slightly etched through ion milling. The conditions for the RIE and the ion milling are similar to those of the first embodiment. Reverse sputtering (sputter etching) may be performed in place of the ion milling.

The method of forming the patterned thin film of this embodiment is the method of patterning the film 21 by etching through RIE and then slightly etching the cross sectional surfaces of the patterned film obtained as described above.

Figure 8A:
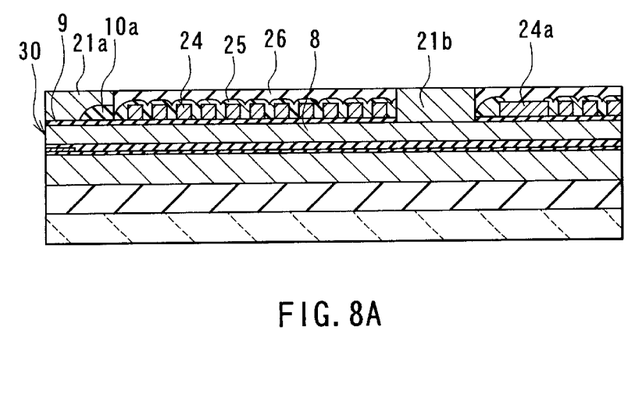
FIG. 8A and FIG. 8B are cross sections for illustrating a step that follows FIG. 7A and FIG. 7B.
Figure 8B:
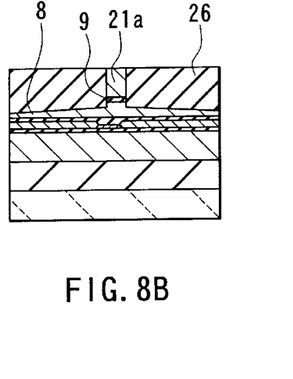

Next, as shown in FIG. 8A and FIG. 8B, the thin-film coil 24 made of copper (Cu), for example, is formed by frame plating, for example, in the coil encasing portion 23. For example, the thickness of the coil 24 is about 1.0 to 2.0 $\mu$m and the pitch is 1.2 to 2.0 $\mu$m. The coil 24 is wound around the magnetic layer 21b. In FIG. 8A numeral 24a indicates a portion for connecting the coil 24 to a lead layer 28 described later.

Next, a photoresist layer 25 is formed to cover the coil 24. An insulating layer 26 of alumina, for example, having a thickness of about 3 to 4 μm is formed over the entire surface. The insulating layer 26 is polished through CMP, for example, so that the pole portion layer 21a and the magnetic layer 21b are exposed, and the surface is flattened.

Figure 9A:
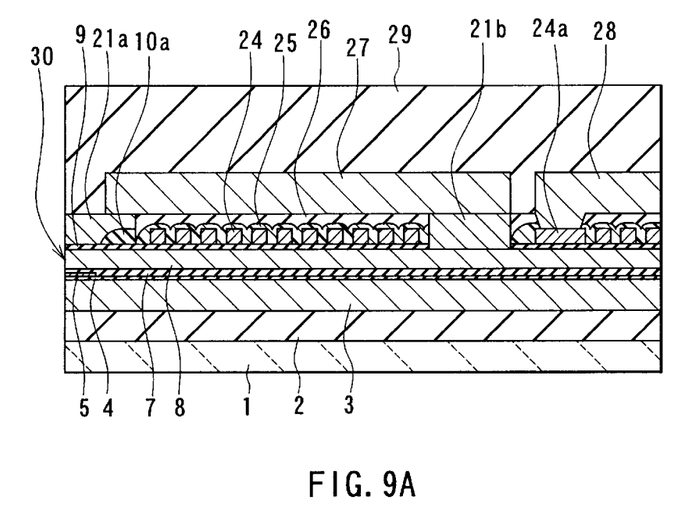
FIG. 9A and FIG. 9B are cross sections for illustrating a step that follows FIG. 8A and FIG. 8B.
Figure 9B:
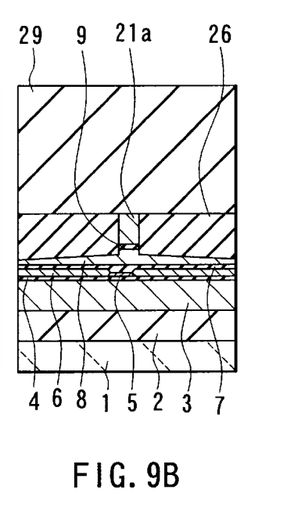

Next, as shown in FIG. 9A and FIG. 9B, a portion of the insulating layer 26 located on the connecting portion 24a is etched to form a contact hole. Next, a yoke portion layer 27 to be the yoke portion of the top pole layer is formed on the pole portion layer 21a, the insulating layer 26 and the magnetic layer 21b. The yoke portion layer 27 has a thickness of about 2 to 3 μm, for example. At the same time, the lead layer 28 to be connected to the portion 24a is formed. The lead layer 28 has a thickness of about 2 to 3 μm, for example. The yoke portion layer 27 may be made of NiFe (80 weight % Ni and 20 weight % Fe), or NiFe (45 weight % Ni and 55 weight % Fe) that is a high saturation flux density material, and may be formed through plating into a specific shape, or may be made of a material such as FeN or FeZrN that is a high saturation flux density material, and may be selectively etched to form a specific shape. Alternatively, a material such as CoFe or a Co-base amorphous material that is a high saturation flux density material may be used. To improve the high frequency characteristics, the yoke portion layer 27 may be made of layers of inorganic insulating films and magnetic layers of Permalloy, for example.

The yoke portion layer 27 has an end face facing toward the air bearing surface 30 that is located at a distance of only 0.5 to 1.0 μm, for example, from the air bearing surface 30. According to this embodiment, in particular, this end face of the yoke portion layer 27 is located near the zero throat height level, that is, an end of the throat height defining layer 10a closer to the air bearing surface 30.

Next, an overcoat layer 29 of alumina, for example, having a thickness of 20 to 40 μm, for example, is formed over the entire surface. The surface of the overcoat layer 19 is flattened and pads (not shown) for electrodes are formed on the overcoat layer 29. Finally, lapping of the slider including the foregoing layers is performed to form the air bearing surface 30 of the thin-film magnetic head including the write head and the read head. The thin-film magnetic head of the embodiment is thus completed.

The remainder of configuration, functions and effects of the second embodiment are similar to those of the first embodiment.

The present invention is not limited to the foregoing embodiment but may be practiced in still other ways. For example, in the foregoing embodiments, the thin-film magnetic head is disclosed, comprising the MR element for reading formed on the base body and the induction-type electromagnetic transducer for writing stacked on the MR element. Alternatively, the MR element may be stacked on the electromagnetic transducer.

That is, the induction-type electromagnetic transducer for writing may be formed on the base body and the MR element for reading may be stacked on the transducer. Such a structure may be implemented by forming a magnetic film functioning as the top pole layer of the foregoing embodiments as a bottom pole layer on the base body, and forming a magnetic film functioning as the bottom pole layer of the embodiments as a top pole layer facing the bottom pole layer with the write gap film in between. In this case it is preferred that the top pole layer of the induction-type electromagnetic transducer functions as the bottom shield layer of the MR element, too.

The method of manufacturing the thin-film magnetic head of the invention may be applied to a thin-film magnetic head dedicated to writing that has an induction-type electromagnetic transducer only or to a thin-film magnetic head performing writing and reading through an induction-type electromagnetic transducer.

The method of forming the patterned thin film of the invention is not limited to patterning of the top pole layer of the write head of the thin-film magnetic head, but may be applied to patterning of the top and bottom shield layers of the read head or the bottom pole layer of the write head.

The method of forming the patterned thin film of the invention is not limited to patterning of a magnetic layer of the thin-film magnetic head, but may be applied to formation of various types of patterned thin films, such as those having wiring patterns using a material such as Cu or Al.

According to the method of forming the patterned thin film of the invention described so far, a portion of the film to be patterned is etched through reactive ion etching to form the patterned thin film. Deposits are then removed from cross-sectional surfaces of the patterned thin film. As a result, it is possible to form the patterned thin film having minute dimensions in a short time, and to prevent corrosion of the patterned thin film.

According to the method of manufacturing the thin-film magnetic head of the invention, a portion of the film to be patterned is etched through reactive ion etching to form the track width defining layer. Deposits are then removed from cross-sectional surfaces of the track width defining layer. As a result, it is possible to form the track width defining layer having minute dimensions in a short time, and to prevent corrosion of the track width defining layer.

Obviously many modifications and variations of the present invention are possible in the light of the above teachings. It is therefore to be understood that within the scope of the appended claims the invention may be practiced otherwise than as specifically described.

What is claimed is:

1. A method of forming a patterned thin film, comprising the steps of:
    forming a film to be patterned, the film being made of a magnetic material;
    forming a mask layer through plating on the film to be patterned, the mask layer touching the film to be patterned and being made of a magnetic material capable of being formed through plating:
    forming a patterned thin film by etching a part of the film to be patterned, using reactive ion etching with the mask layer as a mask; and
    removing deposits on a cross-sectional surface of the patterned thin film that is obtained in the step of forming the patterned thin film, wherein the mask layer is retained on the patterned thin film.

2. The method according to claim 1 wherein ion milling is used in the step of removing the deposits.

3. The method according to claim 1 wherein reverse sputtering is used in the step of removing the deposits.

4. The method according to claim 1 wherein the reactive ion etching is performed through the use of a chlorine-base gas or a fluorine-base gas as a reactive gas in the step of forming the patterned thin film.

5. The method according to claim 1 wherein the reactive ion etching is performed at a temperature in a range of 50 to 300° C. in the step of forming the patterned thin film.

6. The method according to claim 1 wherein the film to be patterned is formed through sputtering.

7. The method according to claim 1 wherein the film to be patterned is made of a high saturation flux density material.

8. The method according to claim 1 wherein the patterned thin film is a magnetic layer that is incorporated in a thin-film magnetic head.

9. A method of manufacturing a thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; the second magnetic layer including a track width defining layer that defines a track width; the method comprising the steps of:

forming the first magnetic layer;

forming the gap layer on the pole portion of the first magnetic layer;

forming the second magnetic layer on the gap layer; and forming the thin-film coil such that the at least part of the coil is placed between the first and second magnetic layers, the at least part of the coil being insulated from the first and second magnetic layers; wherein the step of forming the second magnetic layer includes the steps of:

forming a film to be patterned, the film being made of a magnetic material;

forming a mask layer through plating on the film to be patterned, the mask layer touching the film to be patterned and being made of a magnetic material capable of being formed through plating;

forming the track width defining layer by etching a part of the film to be patterned, using reactive ion etching with the mask layer as a mask; and removing deposits on a cross-sectional surface of the track width defining layer that is obtained in the step of forming the track width defining layer, wherein the mask layer is retained on the patterned thin film.

10. The method according to claim 9 wherein ion milling is used in the step of removing the deposits.

11. The method according to claim 9 wherein reverse sputtering is used in the step of removing the deposits.

12. The method according to claim 9 wherein the reactive ion etching is performed through the use of a chlorine-base gas or a fluorine-base gas as a reactive gas in the step of forming the track width defining layer.

13. The method according to claim 9 wherein the reactive ion etching is performed at a temperature in a range of 50 to 300° C. in the step of forming the track width defining layer.

14. The method according to claim 9 wherein the film to be patterned is formed through sputtering.

15. The method according to claim 9 wherein the film to be patterned is made of a high saturation flux density material.

16. The method according to claim 9, further comprising the step of etching a part of the first magnetic layer around the track width defining layer, using reactive ion etching, after the track width defining layer is formed.

* * * * *